(12) United States Patent
Chen et al.

(10) Patent No.: US 9,965,073 B2
(45) Date of Patent: May 8, 2018

(54) TOUCH DISPLAY SCREEN, MANUFACTURE METHOD THEREOF, AND DISPLAY DEVICE

(71) Applicants: BOE TECHNOLOGY GROUP CO., LTD., Beijing (CN); HEFEI BOE OPTOELECTRONICS TECHNOLOGY CO., LTD., Anhui (CN)

(72) Inventors: Changdi Chen, Beijing (CN); Haiyang Shi, Beijing (CN); Yiyong Luo, Beijing (CN)

(73) Assignees: BOE TECHNOLOGY GROUP CO., LTD. (CN); HEFEI BOE OPTOELECTRONICS CO., LTD. (CN)

( * ) Notice: Subject to any disclaimer, the term of this patent is extended or adjusted under 35 U.S.C. 154(b) by 0 days. days.

(21) Appl. No.: 15/124,193

(22) PCT Filed: Dec. 10, 2015

(86) PCT No.: PCT/CN2015/096972
§ 371 (c)(1),
(2) Date: Sep. 7, 2016

(87) PCT Pub. No.: WO2016/173258
PCT Pub. Date: Nov. 3, 2016

(65) Prior Publication Data
US 2017/0131813 A1 May 11, 2017

(30) Foreign Application Priority Data

Apr. 28, 2015 (CN) .......................... 2015 1 0209226

(51) Int. Cl.
*G06F 3/041* (2006.01)
*G06F 3/044* (2006.01)

(52) U.S. Cl.
CPC ............ *G06F 3/0412* (2013.01); *G06F 3/044* (2013.01); *G06F 2203/04103* (2013.01); *G06F 2203/04104* (2013.01)

(58) Field of Classification Search
None
See application file for complete search history.

(56) References Cited

FOREIGN PATENT DOCUMENTS

| CN | 103677411 A | 3/2014 |
|---|---|---|
| CN | 203759666 U | 8/2014 |

(Continued)

OTHER PUBLICATIONS

Chinese Office Action for Chinese Application No. 201510209226.7, dated Jun. 14, 2016, 6 Pages.

(Continued)

*Primary Examiner* — Kenneth B Lee, Jr.
(74) *Attorney, Agent, or Firm* — Brooks Kushman P.C.

(57) ABSTRACT

The present disclosure provides a touch display screen comprising a display panel and a cover substrate arranged on the display panel. A side of the display panel facing the cover substrate comprises pattern regions where touch electrode patterns are arranged and blank regions which are located between the touch electrode patterns. Vanishing patterns are arranged between the display panel and the cover substrate, the vanishing patterns and the touch electrode patterns are made of a same material, and the vanishing patterns at least correspond to the blank regions.

20 Claims, 2 Drawing Sheets

(56) References Cited

FOREIGN PATENT DOCUMENTS

| | | |
|---|---|---|
| CN | 204009807 U | 12/2014 |
| CN | 104793797 A | 7/2015 |
| KR | 20140015092 A | 2/2014 |

OTHER PUBLICATIONS

Written Opinion and International Search Report for International Application No. PCT/CN2015/ 096972, dated Feb. 24, 2016, 12 Pages.
Chinese Office Action for Chinese Application No. 201510209226.7, dated Dec. 16, 2016, 7 Pages.
Chinese Office Action, English Translation.
International Search Report and Written Opinion, English Translation.
Third Office Action for Chinese Application No. 201510209226.7, dated Jun. 26, 2017, 4 Pages.

TOUCH DISPLAY SCREEN, MANUFACTURE METHOD THEREOF, AND DISPLAY DEVICE

CROSS-REFERENCE TO RELATED APPLICATION

The present application is the U.S. national phase of PCT Application No. PCT/CN2015/096972, filed on Dec. 10, 2015, which claims priority to Chinese patent application No. 201510209226.7 filed on Apr. 28, 2015, the disclosure of which are incorporated herein by reference in their entirety.

TECHNICAL FIELD

The present disclosure relates to a field of touch display, and specifically relates to a touch display screen, a manufacture method of the same, and a display device.

BACKGROUND

Currently, touch techniques are increasingly widely used in electronics products with a display function, such as smart phones, displays, etc. At present, in order to implement a function of multiple-touch, a capacitive touch screen technique is extensively employed in display screens of medium size or small size. According to different structures of capacitive touch screens, the capacitive touch screens can be divided into three categories including an add-on type, an In-cell type, and an On-cell type. The On-cell type is specifically focused on by the industry due to characteristics of good touch sense, easiness to be light and thin, and low costs.

A structure of a typical On-cell type touch display screen is shown in FIG. 1. The structure includes a display panel and a cover substrate 6. The display panel includes an array substrate 1 and a color filter substrate 2 which are arranged opposite to each other to form a cell. A touch electrode pattern 3 is formed on the color filter substrate 2, and an upper polarizer 4 is adhered onto the color filter substrate 2 with the touch electrode pattern 3 formed thereon. The cover substrate 6 is arranged above the upper polarizer 4, and can be adhered to the upper polarizer 4 by means of an OCR adhesive layer 5. The touch electrode pattern is generally formed of Indium Tin Oxide (ITO) and the refractive index thereof is about 1.99. The refractive indices of a base substrate of the color filter substrate 2, a base substrate of the array substrate 1, and the cover substrate 6 are all 1.5, the refractive index of the upper polarizer 4 is 1.49, and the refractive index of the OCR adhesive layer 5 is 1.49. It can be seen from the above that the refractive index of the touch electrode pattern is different from those of other materials. Thus, phase differences appear between lights reflected from areas where the touch electrode pattern is located and lights reflected from other areas. Therefore, an outline of the touch electrode pattern can be seen clearly from outside under an ordinary condition that a backlight module is not lighted or under a condition of strong lights, which significantly affects a display quality.

A frequently-used way in a related art is to plate one or more layers of films onto the touch electrode pattern or the cover substrate additionally. By arranging the refractive indices of the different layers of films, a low reflective film structure can be formed, thereby decreasing surface-reflection from the touch electrode pattern effectively. However, the formation of such a low reflective film structure requires an evaporating process or related film-plating processes, and thus increases both process steps and production costs.

SUMMARY

The technical problem to be solved by the present disclosure is to provide a touch display screen, a manufacture method thereof, and a display device, which can eliminate the phenomenon that the outlines of the touch electrode patterns can be seen clearly from the outside under the ordinary condition that the backlight module is not lighted or under the condition of strong lights, thereby achieving a vanishing effect.

To solve the above technical problem, at least one embodiment of the present disclosure provides technical solutions as follow.

In one aspect, the present disclosure provides in some embodiments a touch display screen, including: a display panel, and a cover substrate arranged on the display panel, wherein a side of the display panel facing the cover substrate includes pattern regions where touch electrode patterns are arranged and blank regions which are located between the touch electrode patterns, wherein vanishing patterns are arranged between the display panel and the cover substrate, the vanishing patterns and the touch electrode patterns are made of a same material, and the vanishing patterns at least correspond to the blank regions.

Further, the vanishing patterns are located on a side of the cover substrate facing the display panel.

Further, the vanishing patterns are located on the cover substrate as a whole layer.

Further, projections of the blank regions on the cover substrate are completely coincident with the vanishing patterns.

Further, the display panel includes a color filter substrate and an array substrate that is arranged oppositely with the color filter substrate to form a cell, and the touch electrode patterns are arranged on a side of the color filter substrate facing the cover substrate.

Further, the touch electrode patterns and the vanishing patterns are formed of the same material.

Further, the material is ITO.

Further, the touch electrode patterns and the vanishing patterns are formed of different materials.

The present disclosure provides in at least one embodiment a display device, which includes the above touch display screen.

The present disclosure provides in at least one embodiment a method for manufacturing a touch display screen, which includes forming a display panel and a cover substrate arranged on the display panel, wherein a side of the display panel facing the cover substrate includes pattern regions where touch electrode patterns are arranged and blank regions which are located between the touch electrode patterns; and forming vanishing patterns between the display panel and the cover substrate, wherein the vanishing patterns and the touch electrode patterns are made of a same material, and the vanishing patterns at least correspond to the blank regions.

Further, the step of forming the vanishing patterns includes forming the vanishing patterns on a side of the cover substrate facing the display panel.

Further, the step of forming the vanishing patterns on a side of the cover substrate facing the display panel includes: forming the vanishing patterns on projections of the blank regions on the cover substrate.

Further, the display panel includes a color filter substrate and an array substrate that is arranged oppositely with the color filter substrate to form a cell. The method further includes: forming the touch electrode patterns on a side of the color filter substrate facing the cover substrate.

The at least one embodiment of the present disclosure have the following advantages:

In the above technical solutions, the vanishing patterns formed of the same material as that of the touch electrode patterns and at least corresponding to the blank regions are arranged between the display panel and the cover substrate. Thus, at edges of the touch electrode patterns, reflective states and refractive states of lights are the same at the inner side of the cover substrate, and therefore, it is eliminated the phenomenon that the outlines of the touch electrode patterns can be seen clearly from the outside under the ordinary condition that the backlight module is not lighted or under the condition of strong lights, thereby achieving the vanishing effect.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

REFERENCE NUMERALS

Figure 1:
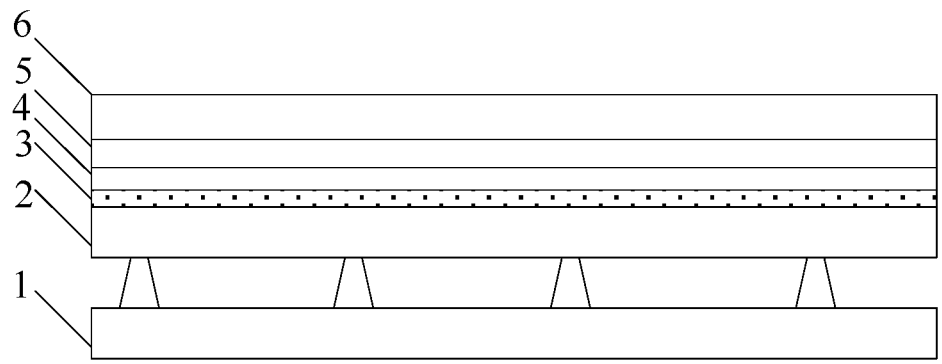
FIG. 1 is a structural schematic diagram of an On-cell type touch display screen in the related art.

1 array substrate
2 color filter substrate
3 touch electrode pattern
4 upper polarizer
5 OCR adhesive layer
6 cover substrate
7 vanishing pattern

DETAILED DESCRIPTION

The present disclosure will be described hereinafter in conjunction with the drawings and embodiments. The following embodiments are for illustrative purposes only, but shall not be used to limit the scope of the present disclosure.

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

The technical solutions of embodiments of the present disclosure will be described clearly and briefly hereinafter in combination with the drawings of the embodiments of the present disclosure. Obviously, the described embodiments are only a part, but not all, of the embodiments of the present disclosure. All other embodiments obtained by one skilled in the art based on the embodiments of the present disclosure fall into the scope of the present disclosure.

For the technical problem in the related art that because the phase differences exist between the lights reflected from the areas where the touch electrode patterns are located and the lights reflected from other areas, the outlines of the touch electrode patterns can be seen clearly from outside under the ordinary condition that the backlight module is not lighted or under the condition of strong lights, thus significantly affecting the display quality, the present disclosure provides a touch display screen, a manufacture method of the same, and a display device, which can eliminate the phenomenon that the outlines of the touch electrode patterns can be seen clearly from outside under the ordinary condition that the backlight module is not lighted or under the condition of strong lights, thereby achieving a vanishing effect.

In at least one embodiment, the present disclosure provides a touch display screen, including: a display panel, and a cover substrate arranged on the display panel, wherein a side of the display panel facing the cover substrate includes pattern regions where touch electrode patterns are arranged and blank regions which are located between the touch electrode patterns, wherein vanishing patterns are arranged between the display panel and the cover substrate, the vanishing patterns and the touch electrode patterns are made of a same material, and the vanishing patterns at least correspond to the blank regions.

Phases of lights reflected after ambient lights transmit through the touch electrode patterns are relevant to the refractive index of the material of the touch electrode patterns. Because the refractive index of the material of the touch electrode patterns is different from those of film layers such as the substrates, the polarizer or the like, the phase differences may exist between the lights reflected after the ambient lights pass through the touch electrode patterns and the lights reflected from other areas, under the ordinary condition that the backlight module is not lighted or under the condition of strong lights. Thus, the outlines of the touched electrode patterns can be seen clearly from the outside. With the purpose of preventing such a phenomenon from appearing, in at least one embodiment, the vanishing patterns that are formed of the same material as that of the touch electrode patterns and at least correspond to the blank regions are arranged between the display panel and the cover substrate. Because the vanishing patterns and the touch electrode patterns are formed of the same material, the refractive index of the vanishing patterns is equal to that of the touch electrode patterns. Thus, at edges of the touch electrode patterns, reflective states and refractive states of lights are the same at an inner side of the cover substrate, and therefore, it is eliminated the phenomenon that the outlines of the touch electrode patterns can be seen clearly from the outside under the ordinary condition that the backlight module is not lighted or under the condition of strong lights will not appear, thereby achieving the vanishing effect.

In at least one embodiment, the vanishing patterns are independent and not in electrical connection with other elements, and are not used to transmit signals, but only used to change the reflective states of the ambient lights at the inner side of the cover substrate. Optionally, the vanishing patterns are located a side of the cover substrate facing the display panel. That is, the vanishing patterns are located at the inner side of the cover substrate. In this way, the reflective states and the refractive states of the lights at the inner side of the cover substrate can be the same, thereby eliminating the technical problem that the outlines of the touch electrode patterns are seen under the ordinary condition that the backlight module is not lighted or under the condition of strong lights.

The vanishing patterns can be of a whole layer, or can be arranged only corresponding to the blank regions. In an optional embodiment, the vanishing patterns are arranged only corresponding to the blank regions, i.e., projections of the blank regions on the cover substrate completely coincide with the vanishing patterns. In this way, the amount of material for manufacturing the vanishing patterns can be saved, and the reflective states and the refractive states of the lights at the inner side of the cover substrate are the same at the edges of the touch electrode patterns.

In specific embodiments, the display panel includes a color filter substrate and an array substrate that is arranged oppositely with the color filter substrate to form a cell. In such a case, the touch electrode patterns can be arranged on a side of the color filter substrate facing the cover substrate.

The vanishing patterns can be made of the same material as that of touch electrodes, such that the refractive index of the vanishing patterns is exactly equal to that of the touch electrode patterns. Of course, the vanishing pattern may also be formed of a material having a refractive index similar to the refractive index of the material of the touch electrode, but in this case, a complete vanishing effect might not be achieved. Because the touch electrode patterns in a related touch display screen are typically made of ITO, the vanishing patterns may optionally be made of ITO.

In at least one embodiment, the present disclosure provides a display device, which includes the above touch display screen. The display device can be any product or component having a display function, such as a liquid crystal panel, a liquid crystal television, a liquid crystal display, a digital photo frame, a mobile phone, a tablet computer, a navigating instrument, or an electronic paper.

In at least one embodiment, the present disclosure provides a method for manufacturing a touch display screen, which includes forming a display panel and a cover substrate arranged on the display panel, wherein a side of the display panel facing the cover substrate includes pattern regions where touch electrode patterns are arranged and blank regions which are located between the touch electrode patterns.

The method includes: forming vanishing patterns between the display panel and the cover substrate, wherein the vanishing patterns and the touch electrode patterns are made of a same material, and the vanishing patterns at least correspond to the blank regions.

In at least one embodiment, vanishing patterns which are made of the same material as that of the touch electrode patterns and at least correspond to the blank regions are arranged between the display panel and the cover substrate. Because the vanishing patterns and the touch electrode patterns are formed of the same material, the refractive index of the vanishing patterns is equal to that of the touch electrode patterns. Thus, at edges of the touch electrode patterns, the reflective states and the refractive states of lights are the same at the inner side of the cover substrate, and therefore, it is eliminated the phenomenon that the outlines of the touch electrode patterns can be seen clearly from the outside under the ordinary condition that the backlight module is not lighted or under the condition of strong lights, thereby achieving the vanishing effect.

In at least one embodiment, the vanishing patterns are independent without being in electrical connection with other elements, and are not used to transmit signals, but only used to change the reflective states of the ambient lights at the inner side of the cover substrate. Optionally, the step of forming vanishing patterns includes forming the vanishing patterns on a side of the cover substrate facing the display panel. That is, the vanishing patterns are located at the inner side of the cover substrate. In this way, the reflective states and the refractive states of the lights at the inner side of the cover substrate can be the same, thereby eliminating the technical problem that the outlines of the touch electrode patterns are seen under the ordinary condition that the backlight module is not lighted or under the condition of strong lights.

The vanishing patterns can be formed as a whole layer, or can be arranged corresponding to the blank regions. In an optional embodiment, the vanishing patterns are only arranged to correspond to the blank regions, i.e., the step of forming the vanishing patterns on a side of the cover substrate facing the display panel includes forming the vanishing patterns at positions corresponding to projections of the blank regions onto the cover substrate. In this way, the amount of material for manufacturing the vanishing patterns can be saved, and the reflective states and the refractive states of lights at the inner side of the cover substrate are the same at the edges of the touch electrode patterns.

In at least one embodiment, in the case that the display panel includes the color filter substrate, a liquid crystal layer, and the array substrate that is arranged oppositely with the color filter substrate to form a cell, the method for manufacturing a touch display screen includes the following steps.

Step S1: manufacturing the display panel including the array substrate 1 and the color filter substrate 2. The Step S1 specifically includes providing a base substrate and forming rows of gate lines, columns of data lines, thin film transistors and pixel electrodes on the base substrate, thus completing manufacturing of the array substrate 1, wherein the thin film transistors are positioned in pixel areas defined by the gate lines and the data lines, and the pixel electrodes are arranged in matrix on the array substrate; each of the pixel electrodes corresponds to one pixel area, and is connected with a drain electrode of a thin film transistor in the corresponding pixel area through a via hole; and a gate electrode of the thin film transistor is connected with a corresponding gate line, and a source electrode of the thin film transistor is connected with a corresponding data line; in operation of the array substrate, strobing of each thin film transistor is controlled by the gate line, and when the thin film transistor is turned on, the source electrode and the drain electrode are conducted by a channel of the thin film transistor, and the drain electrode is connected to the corresponding pixel electrode.

The step S1 further includes providing another base substrate and forming sequentially a black matrix, a color filter unit, an overcoat, a spacer, and a common electrode on the base substrate, thus completing manufacturing of the color filter substrate 2. If the array substrate is a vertical-electric-field type array substrate, the common electrode is not formed on the array substrate, but is formed on the corresponding color filter substrate; in contrast, if the array substrate is a horizontal-electric-field type array substrate, the common electrode is formed on the array substrate, and is not formed on the corresponding color filter substrate.

The step S1 further includes coating sealant at a sealant coating area on the color filter substrate 2, and dripping liquid crystals on the array substrate 1. Specifically, an amount of the liquid crystals and a trajectory of dripping the liquid crystals can be determined based on structures and sizes of liquid crystal cells. Generally, the liquid crystals should be kept not to spread to be in contact with the sealant before forming the cell; and the cell is formed with the color filter substrate being arranged above and the array substrate being arranged below; and the sealant is cured, thus completing manufacturing of the display panel.

Step S2: forming touch electrode patterns 3 on a side of the color filter substrate 2 that is further away from the array substrate 1 than the other side of the color filter substrate 2. Specifically, the step S2 includes depositing a transparent conductive layer having a thickness of about 20-1000 Å on the side of the color filter substrate by a film layer formation process such as magnetron sputtering or thermal evaporation, wherein the material of the transparent conductive layer may be the ITO; coating photoresist on the transparent conductive layer, and processing the transparent conductive layer by processes of exposing and developing, etching the transparent conductive layer, and removing the photoresist. Thus the touch electrode patterns 3 formed of the transparent conductive layer is formed, and blank regions exist between the touch electrode patterns 3.

Step S3: providing a cover substrate 6, and forming vanishing patterns 7 on a side of the cover substrate 6. Specifically, the step S3 includes depositing a transparent conductive layer having a thickness of about 20-1000 Å on the side of the cover substrate 6 by a film layer formation process such as magnetron sputtering or thermal evaporation, wherein the transparent conductive layer is formed of ITO; coating a photoresist on the transparent conductive layer, and processing the transparent conductive layer by processes of exposing and developing, and etching the transparent conductive layer and removing the photoresist. Thus, the vanishing patterns 7 formed of the transparent conductive layer are formed, and the locations of the vanishing patterns 7 correspond to the blank regions between the touch electrode patterns 3, and the vanishing patterns 7 are independent without being in electrical connection with other elements and are not used to transmit signals.

Figure 2:
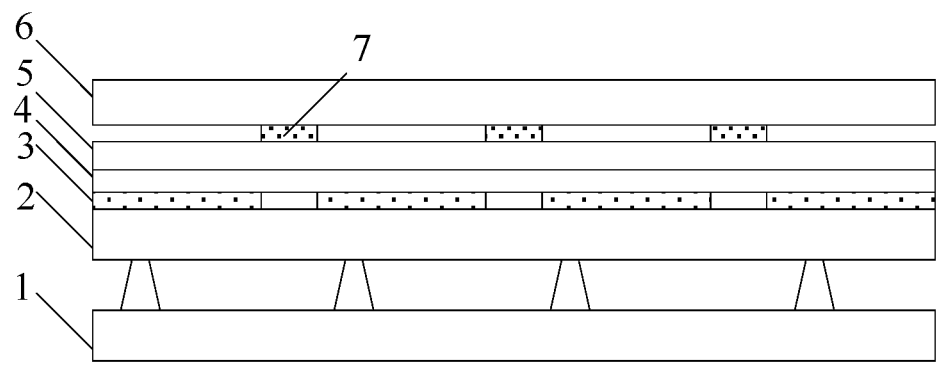
FIG. 2. is a structural schematic diagram of a touch display screen according to some embodiments of the present disclosure.

Step S4: adhering a polarizer plate 4 to the display panel, and adhering the cover substrate 6 and the display panel together by using an Optically Clear Resin (OCR) adhesive layer 5, wherein the side of the cover substrate 6 having the vanishing patterns 7 formed thereon faces the display panel, thus forming the touch display screen as shown in FIG. 2.

Figure 3:
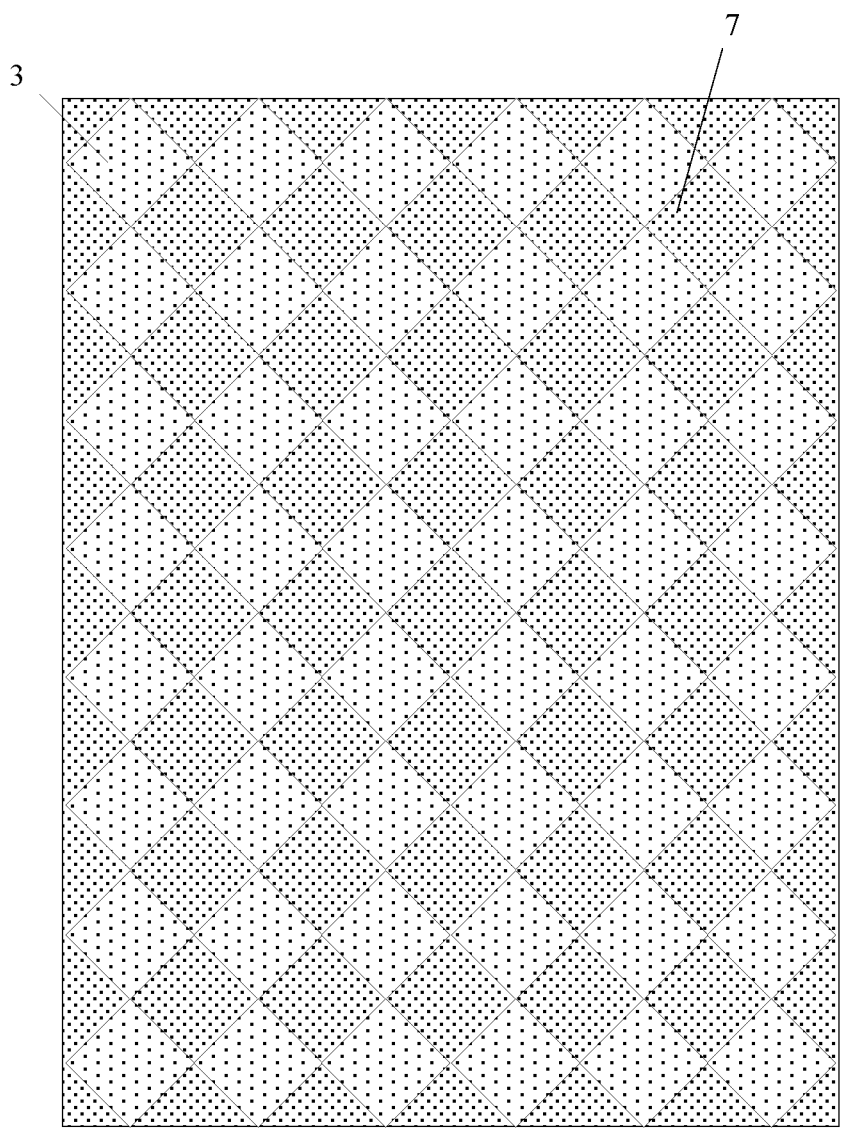
FIG. 3. is a planar schematic diagram of vanishing patterns according to some embodiments of the present disclosure.

As shown in FIG. 3, the vanishing patterns 7 correspond to the blank regions where the touch electrode patterns 3 are not arranged, and are complementary to the touch electrode patterns 3. Because the vanishing patterns and the touch electrode patterns are formed of the same material, the refractive index of the vanishing patterns is equal to that of the touch electrode patterns. Thus, at edges of the touch electrode patterns, the reflective states and the refractive states of lights are the same at the inner side of the cover substrate, and therefore, it is eliminated the phenomenon that the outlines of the touch electrode patterns can be seen clearly from the outside under the ordinary condition that the backlight module is not lighted or under the condition of strong lights, thereby achieving the vanishing effect.

The above are merely the preferred embodiments of the present disclosure. A person skilled in the art may make further modifications and improvements without departing from the principle of the present disclosure, and these modifications and improvements shall also fall within the scope of the present disclosure.

What is claimed is:

1. A touch display screen, comprising:
a display panel, and
a cover substrate arranged on the display panel, wherein the display panel comprises, at a side facing the cover substrate, pattern regions where touch electrode patterns are arranged and blank regions which are located between the touch electrode patterns, wherein vanishing patterns are arranged between the display panel and the cover substrate, the vanishing patterns and the touch electrode patterns are made of a same material, the vanishing patterns at least correspond to the blank regions, and the vanishing patterns are not in electrical connection with any other element of the touch display screen, and are not used to transmit signals.

2. The touch display screen according to claim 1, wherein the vanishing patterns are arranged on a side of the cover substrate facing the display panel.

3. The touch display screen according to claim 2, wherein the vanishing patterns are arranged on the cover substrate as a whole layer.

4. The touch display screen according to claim 1, wherein projections of the blank regions on the cover substrate coincide with the vanishing patterns respectively.

5. The touch display screen according to claim 1, wherein the display panel comprises a color filter substrate and an array substrate that are arranged opposite to each other to form a cell, wherein the touch electrode patterns are arranged on a side of the color filter substrate facing the cover substrate.

6. The touch display screen according to claim 2, wherein projections of the blank regions on the cover substrate coincide with the vanishing patterns respectively.

7. The touch display screen according to claim 1, wherein the touch electrode patterns and the vanishing patterns are made of Indium Tin Oxide (ITO).

8. The touch display screen according to claim 2, wherein the display panel comprises a color filter substrate and an array substrate that are arranged opposite to each other to form a cell, wherein the touch electrode patterns are arranged on a side of the color filter substrate facing the cover substrate.

9. A display device comprising the touch display panel according to claim 1.

10. A method for manufacturing a touch display screen, comprising:
forming a display panel and a cover substrate arranged on the display panel, wherein the display panel comprises, at a side facing the cover substrate, pattern regions where touch electrode patterns are arranged and blank regions which are located between the touch electrode patterns; and forming vanishing patterns between the display panel and the cover substrate, wherein the vanishing patterns and the touch electrode patterns are made of a same material, the vanishing patterns at least correspond to the blank regions, and the vanishing patterns are not in electrical connection with any other element of the touch display screen, and are not used to transmit signals.

11. The method according to claim 10, wherein the step of forming the vanishing patterns comprises:
forming the vanishing patterns on a side of the cover substrate facing the display panel.

12. The method according to claim 11, wherein the step of forming the vanishing patterns on a side of the cover substrate facing the display panel comprises: forming the vanishing patterns at positions corresponding to projections of the blank regions onto the cover substrate.

13. The method according to claim 10, wherein the display panel comprises a color filter substrate and an array substrate that are arranged opposite to each other to form a cell, and the method further comprises:
forming the touch electrode patterns on a side of the color filter substrate facing the cover substrate.

14. The display device according to claim 9, wherein the vanishing patterns are arranged on a side of the cover substrate facing the display panel.

15. The display device according to claim 14, wherein the vanishing patterns are arranged on the cover substrate as a whole layer.

16. The display device according to claim 9, wherein projections of the blank regions on the cover substrate coincide with the vanishing patterns respectively.

17. The display device according to claim 9, wherein the display panel comprises a color filter substrate and an array substrate that are arranged opposite to each other to form a cell, wherein the touch electrode patterns are arranged on a side of the color filter substrate facing the cover substrate.

18. The display device according to claim 14, wherein projections of the blank regions on the cover substrate coincide with the vanishing patterns respectively.

19. The display device according to claim 9, wherein the touch electrode patterns and the vanishing patterns are made of ITO.

20. The display device according to claim 14, wherein the display panel comprises a color filter substrate and an array substrate that are arranged opposite to each other to form a cell, wherein the touch electrode patterns are arranged on a side of the color filter substrate facing the cover substrate.

* * * * *

UNITED STATES PATENT AND TRADEMARK OFFICE
CERTIFICATE OF CORRECTION

PATENT NO. : 9,965,073 B2
APPLICATION NO. : 15/124193
DATED : May 8, 2018
INVENTOR(S) : Changdi Chen Page 1 of 1

It is certified that error appears in the above-identified patent and that said Letters Patent is hereby corrected as shown below:

On the Title Page

Delete:
"(73) Assignees: BOE TECHNOLOGY GROUP CO., LTD. (CN); HEFEI BOE OPTOELECTRONICS CO., LTD. (CN)"

Insert:
-- (73) Assignees: BOE TECHNOLOGY GROUP CO., LTD. (CN); HEFEI BOE OPTOELECTRONICS TECHNOLOGY CO., LTD. (CN) --

Signed and Sealed this
Seventeenth Day of July, 2018

Andrei Iancu
*Director of the United States Patent and Trademark Office*